US008336820B2

(12) United States Patent
Osorio et al.

(10) Patent No.: US 8,336,820 B2
(45) Date of Patent: Dec. 25, 2012

(54) AIRCRAFT CABIN FLOOR STRUCTURES, SYSTEMS AND METHODS

(75) Inventors: Silvio Luiz Francisco Osorio, São José dos Campos (BR); Erich Robert Schaay, São José dos Campos (BR); Marcos Dressler Arantes, São José dos Campos (BR)

(73) Assignee: Embraer S.A., Sao Jose Dos Campos-SP (BR)

( * ) Notice: Subject to any disclaimer, the term of this patent is extended or adjusted under 35 U.S.C. 154(b) by 1001 days.

(21) Appl. No.: 12/259,209

(22) Filed: Oct. 27, 2008

(65) Prior Publication Data

US 2010/0102171 A1   Apr. 29, 2010

(51) Int. Cl.
*B64C 1/18* (2006.01)
(52) U.S. Cl. ............ 244/118.1; 244/131; 52/650.1
(58) Field of Classification Search .............. 244/117 R, 244/118.1, 118.5, 119, 131; 248/503.1; 52/342, 52/650.1, 653.1
See application file for complete search history.

(56) References Cited

U.S. PATENT DOCUMENTS

| 6,029,407 A * | 2/2000 | Schillero, Jr. .............. 52/127.2 |
| 6,554,225 B1 * | 4/2003 | Anast et al. .............. 244/117 R |
| 7,874,516 B2 * | 1/2011 | Cacciaguerra ............... 244/119 |
| 2005/0211833 A1 * | 9/2005 | Frantz et al. ............... 244/118.1 |
| 2010/0038483 A1 * | 2/2010 | Yamasaki ................. 244/118.6 |

FOREIGN PATENT DOCUMENTS

| WO | WO 2006/102090 A1 | 9/2006 |
| WO | WO 2007/122096 A1 | 11/2007 |

* cited by examiner

*Primary Examiner* — Rob Swiatek
(74) *Attorney, Agent, or Firm* — Nixon & Vanderhye P.C.

(57) ABSTRACT

Structures, systems and methods provide a load-bearing aircraft flooring within an aircraft's fuselage. Load-supporting aircraft flooring systems preferably are provided with a longitudinally separated series of transverse bridges having an upper doubler flange which defines latitudinally separated upper openings, and a latitudinally separated series of beams which include an upper flange and a pair of separated depending web flanges received within respective upper openings of transverse bridges. The upper flanges and web flanges of the beams may thus be connected to the transverse bridges so as to support aircraft flooring panels connected to the beams. Seat tracks for attaching aircraft seats and/or other interior aircraft structures/monuments are preferably fixed to the upper flanges of the beams coincident with its longitudinal axis.

28 Claims, 6 Drawing Sheets

AIRCRAFT CABIN FLOOR STRUCTURES, SYSTEMS AND METHODS

TECHNOLOGICAL FIELD

The disclosed structures, systems and methods relate generally to flooring installed within an aircraft fuselage.

BACKGROUND AND SUMMARY

Due to reduced cabin cross-sections, executive and smaller commercial airplanes typically are designed without cargo compartments below the cabin floor. Instead, the cabin sub-floor space available in such aircraft is typically used to house aircraft system components such as, environmental (air-conditioning) ducts, hydraulic tubing, wiring harnesses, control cables and the lie. In general, the structures needed to support the loads of the cabin floor have typically been formed of separate beam and support post components made of light weight sheet metal (aluminum). These separate structures are then connected, e.g., by rivets, so as to fabricate the sub-flooring support system. As a result, a large number of individual flooring system components each having separate part numbers must be inventoried and assembled thereby aggravating fabrication time and weight.

It is known, for example, from WO 2007/122096 to provide an aircraft flooring system having at least one central rail mounted to a rigid aircraft structure, at least two lateral rails placed on either side of the central rail and each being connected vertically to the aircraft structure by a vertical connecting rod but being free transversely. Floor panels are place between two adjacent central rails so that transverse stresses to which the lateral rails are subjected pass through the floor panels as far as the central rails.

Integrated aircraft flooring structures have been proposed in WO 2006/102090 which include top and bottom layer skins and a structural core formed of a honeycomb composite material disposed between the skins.

It would therefore be highly desirable if aircraft cabin flooring structures could be integrated in a manner that would reduce the parts inventory and/or weight associated with conventional aircraft flowing systems. It is toward providing such needs that the present invention is directed.

Broadly, the structures, systems and methods disclosed herein provide a load-bearing aircraft flooring within an aircraft's fuselage. In especially preferred embodiments, load-supporting aircraft flooring systems will be provided with a longitudinally separated series of transverse bridges having an upper doubler flange which defines latitudinally separated upper openings, and a latitudinally separated series of beams which include an upper flange and a pair of separated depending web flanges received within respective upper openings of transverse bridges. The upper flanges and web flanges of the beams may thus be connected to the transverse bridges.

The transverse bridges may include latitudinally separated Y-shaped supports which define the upper openings thereof. According to certain embodiments, the Y-shaped supports include an upper fork region and a lower support post region. The lower support post region may define outwardly and downwardly divergent side edges. Additionally (or alternatively), the upper fork region may define outwardly and upwardly divergent side edges. The web flanges of the beams may have outwardly directed stiffener flanges at terminal ends thereof. Angle brackets may be provided to join the web flanges to the transverse bridges (e.g., by means of bolt assemblies, rivets and the like).

According to some embodiments, the beams will include opposed bridge fixation fingers protruding outwardly from the upper flange of the beam for joining the beams to a respective underlying one of the transverse bridges. Aircraft flooring panels may thus be connected to the beams, preferably by means of flooring fixation fingers protruding outwardly from the upper flange of the beams. Seat tracks for attaching aircraft seats and/or other interior aircraft structures/monuments are preferably fixed to the upper flanges of the beams coincident with its longitudinal axis.

A pair of longitudinally oriented angled side sills may be provided according to certain embodiments to attach the bridges to the aircrafts fuselage. Preferably, the side sills will have lower attachment fingers for attachment to respective ends of the transverse bridges and upper attachment fingers adapted for connection to structural components of an aircraft fuselage.

The transverse bridges, longitudinal beams and/or side sills are preferably formed of a fiber-reinforced composite material. Alternatively, one or each of such components may be formed of a light weight metal (e.g., aluminum).

An aircraft flooring system formed from a series of the transverse bridges and beams by positioning the bridges transversely relative to an aircraft fuselage, positioning the beams longitudinally relative to the aircraft fuselage such that the web flanges of the beams are received in respective ones of the upper openings of the bridges, and joining the bridges and beams to one another. Aircraft flooring panels may then be joined to the beams. The bridges may also be joined to structural components of the aircraft fuselage, e.g., by means of side sills as note briefly above.

These and other features and advantages will be better and more completely understood by referring to the following detailed description of exemplary non-limiting illustrative implementations in conjunction with the drawings.

BRIEF DESCRIPTION OF THE DRAWINGS

An exemplary non-limiting illustrative implementation of the herein disclosed subject matter will be further explained by reference to the drawings of which.

DETAILED DESCRIPTION

Figure 1:
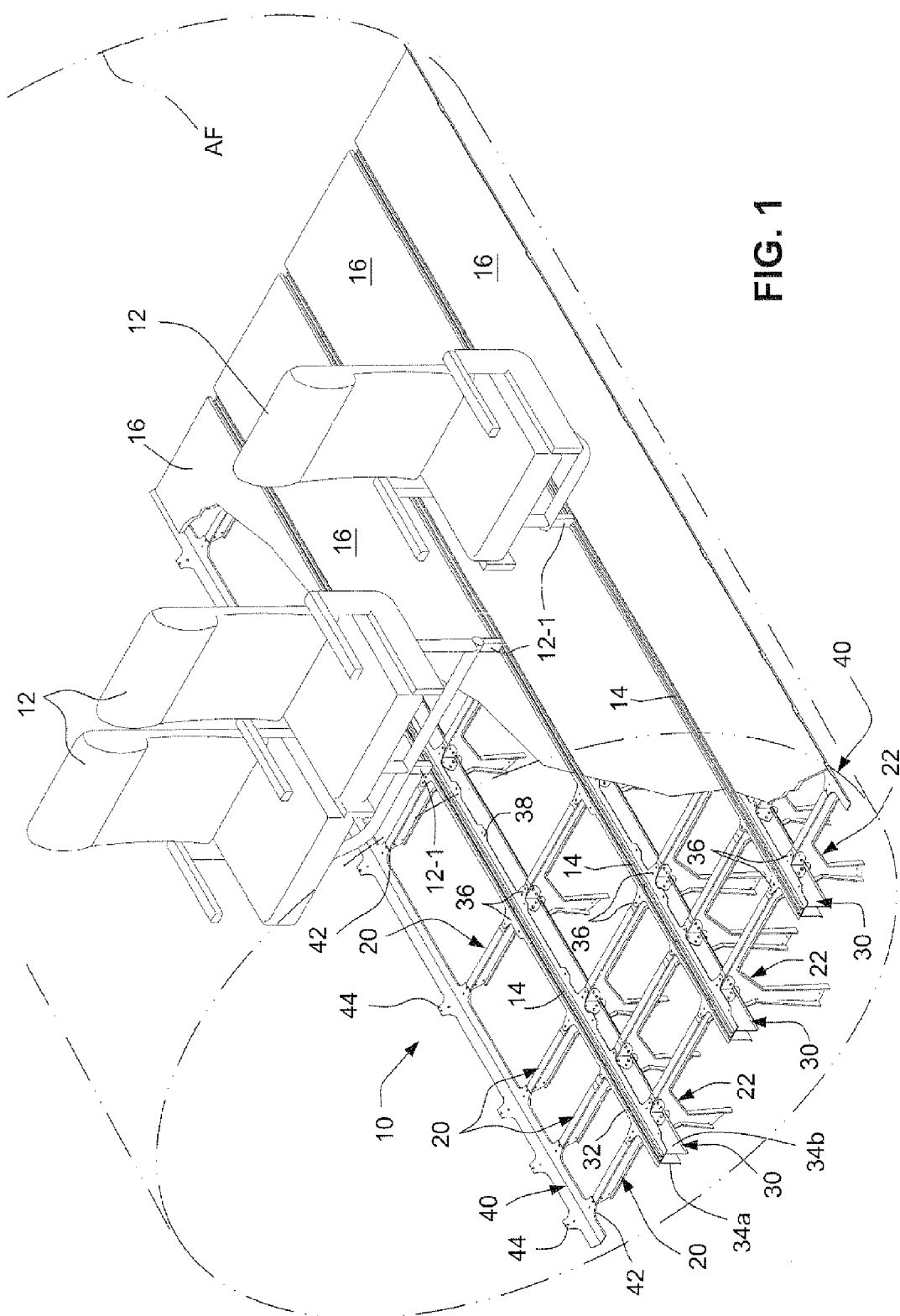
FIG. 1 is partial cross-sectional x-ray view of an aircraft fuselage section which includes a cabin flooring system according to one embodiment of the herein disclosed technology.

A partial cross-sectional x-ray view of an aircraft fuselage section AF which includes a cabin flooring system 10 according to one embodiment of the herein disclosed technology is depicted in accompanying FIG. 1. By way of example, FIG. 1 shows several aircraft passenger seats 12 having the seat supports 12-1 attached to longitudinal seat tracks 14 fixed to the cabin flooring system. In addition, by way of example, FIG. 1 shows flooring panels 16 attached to the cabin flooring system 10. The cabin flooring system thus supports the weight loads on both the passenger seats 12 and the flooring panels 16.

Figure 2:
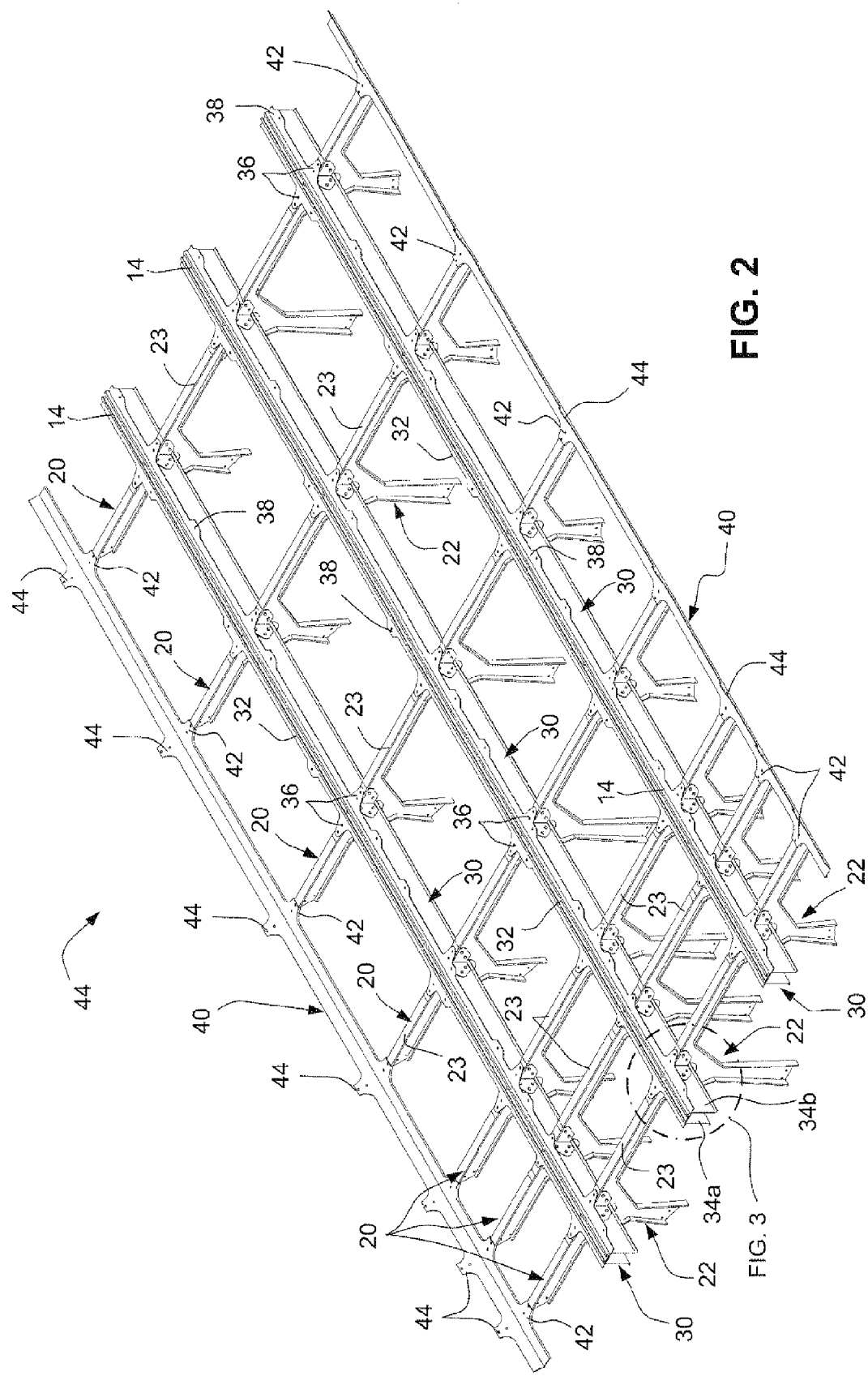
FIG. 2 is an enlarged perspective view of the aircraft cabin flooring system depicted in FIG. 1.
Figure 3:
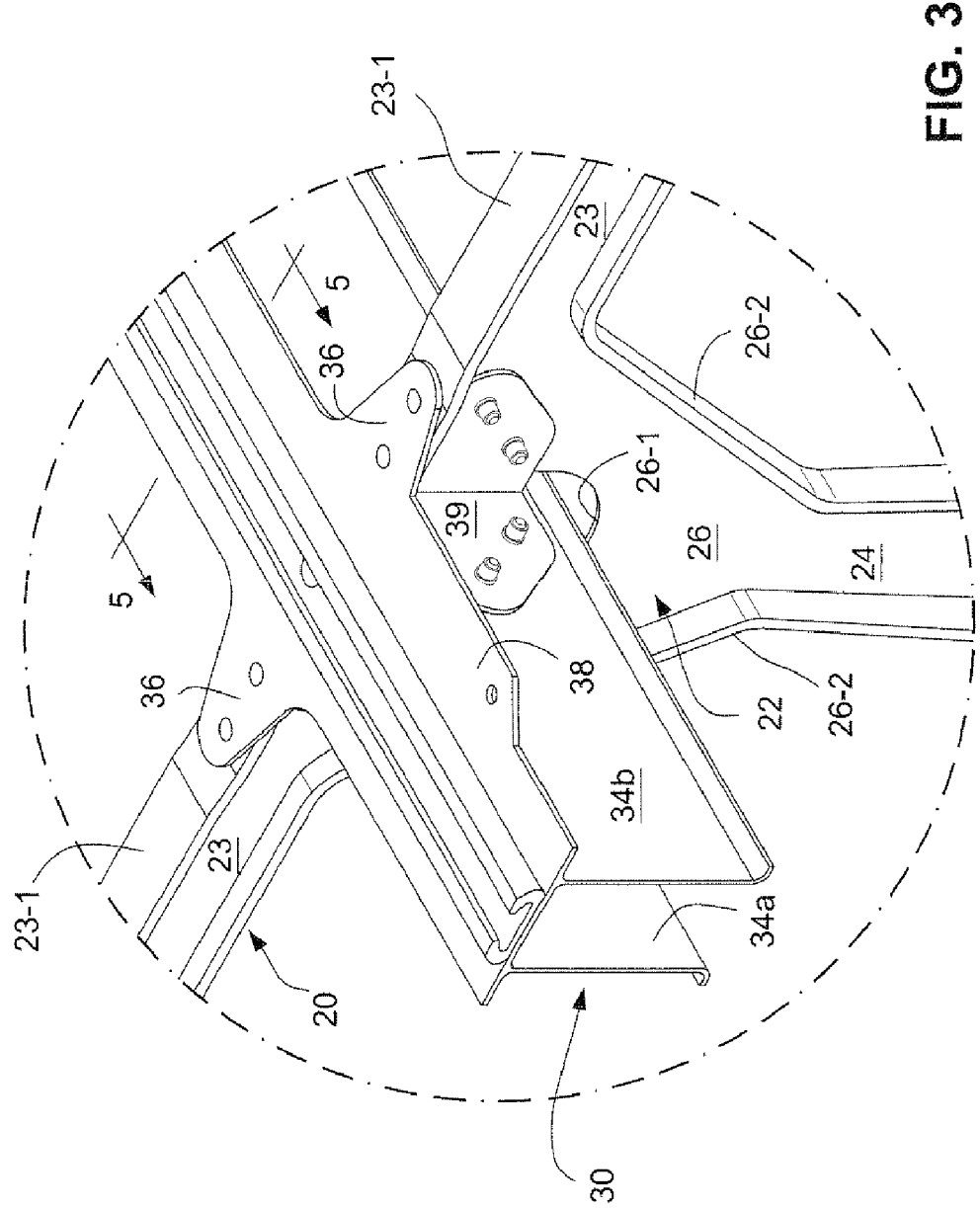
FIG. 3 is an enlarged perspective view of the aircraft cabin flooring system as identified by the chain line in FIG. 2.
Figure 4:
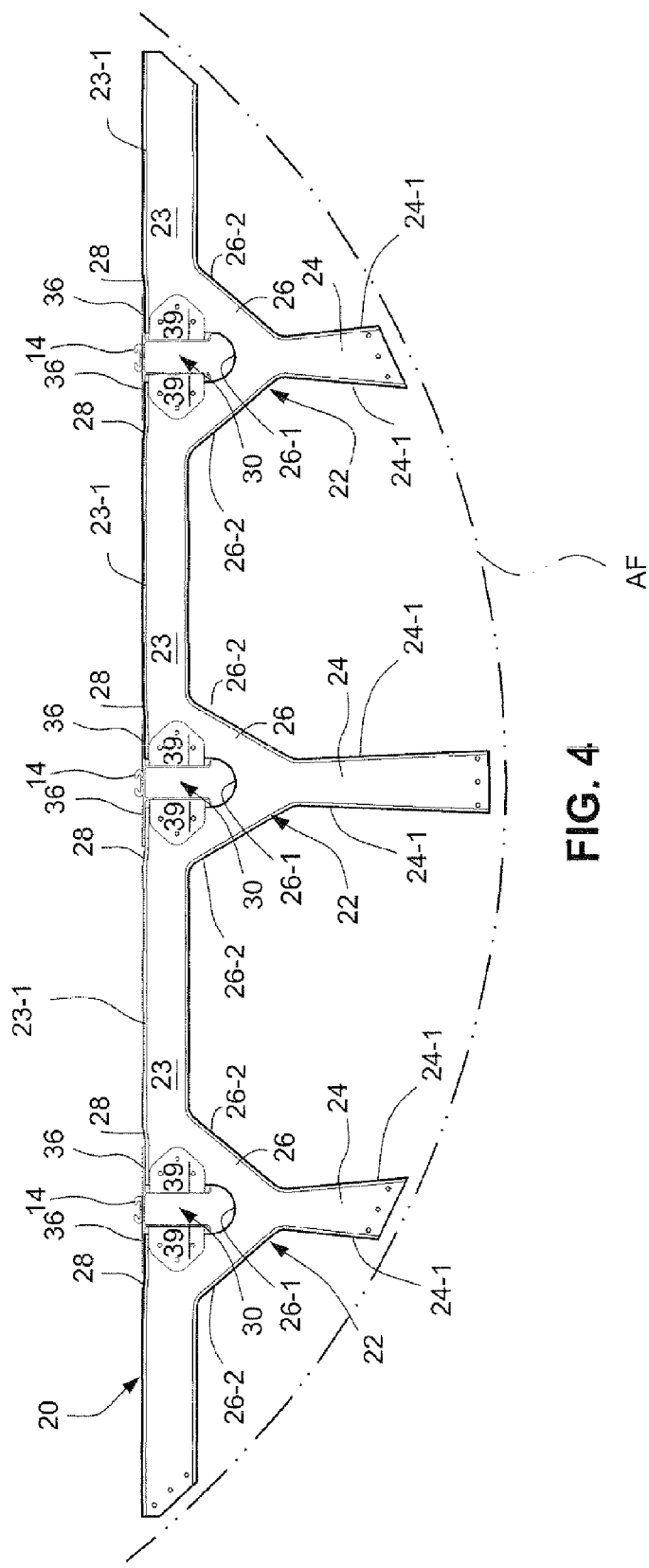
FIG. 4 is an end elevational view of the aircraft cabin flooring system shown in FIG. 2.

As is perhaps better shown in FIGS. 2-4, the flooring system 10 is generally comprised of transverse bridges 20 and longitudinal beams 30. The transverse bridges 20 are attached to the frame and/or stringer members (not shown) of the aircraft fuselage AF by angled longitudinal sill members 40. Each of the bridges 20, beams 30 and sill members 40 is preferably formed of fiber-reinforced composite materials. As used herein and in the accompanying claims, the term "fiber-reinforced composite materials" means those materials that include reinforcing fibers (e.g., synthetic fibers such as graphite fibers) embedded in a polymeric matrix (e.g., an epoxy resins). Various techniques are well known to those in the art to form fiber-reinforced composite materials into useful structural components, including the components employed in the cabin flooring system 10. For example, the components employed in the cabin flooring system 10 may be fabricated using conventional resin transfer molding (RTM) and/or vacuum assisted resin transfer molding (VaRTM) techniques. Thus, when formed of fiber-reinforced composite materials, each of the bridges 20, beams 30 and sill members 40 may be formed of individual unitary (one-piece) components that may be integrally joined to one another with minimal rivet locations (thereby minimizing rivet through holes that reduces structural integrity). Alternatively, the components of the cabin flooring system 10 may be fabricated from conventional light weight metal (e.g., aluminum), although some of the beneficial attributes of fiber-reinforced composite materials described previously may not be achieved (e.g., the ability to provide the individual components as unitary structures).

Figure 5:
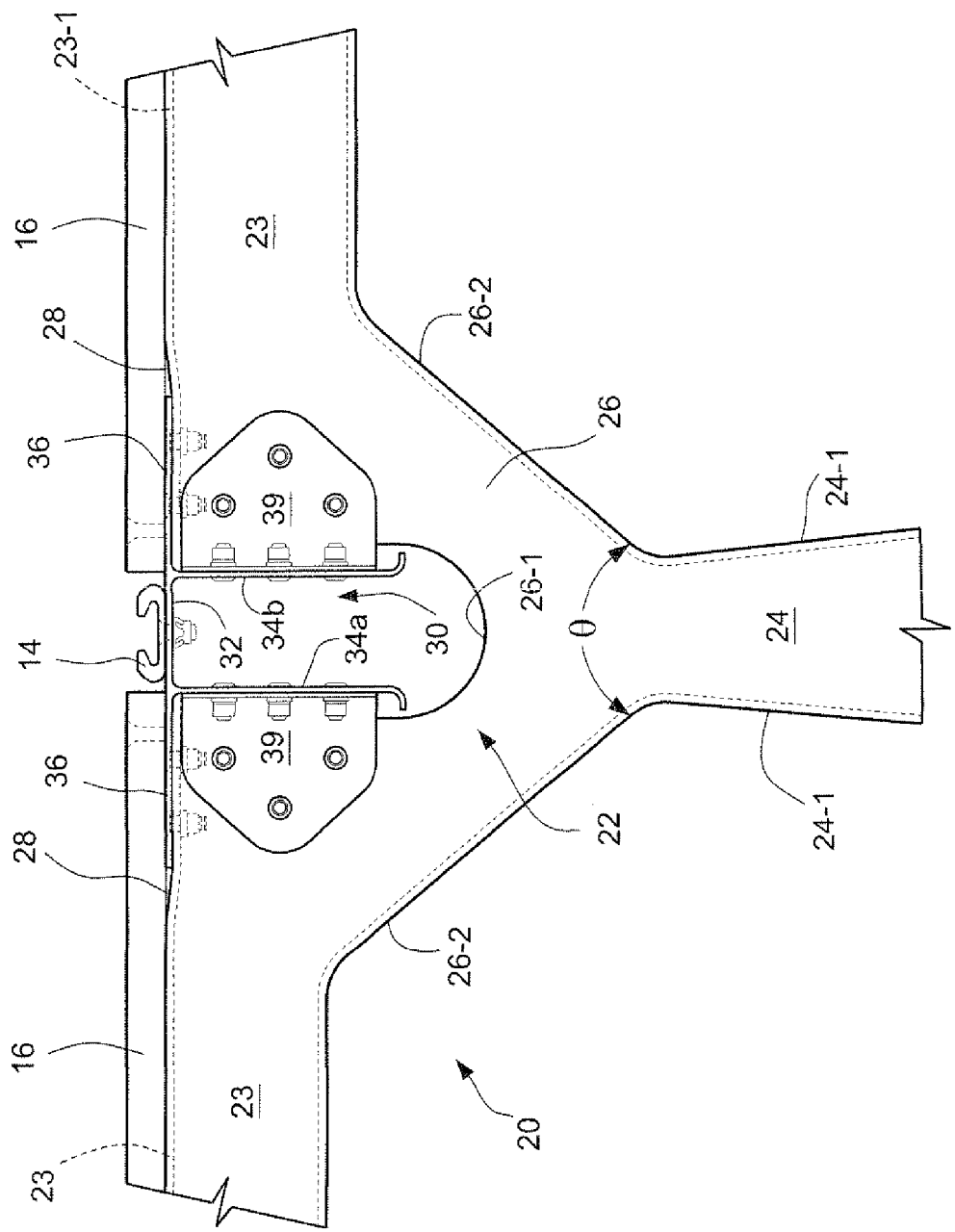
FIG. 5 is an enlarged cross-sectional elevational view of the aircraft cabin flooring system as taken along line 5-5 in FIG. 3.

The transverse bridges 20 are flanged structures that include a series (e.g., three in the depicted embodiment) of laterally separated flanged Y-shaped supports 22 connected by flanged horizontal bridge sections 23 which include an upper doubler flange 23-1 adapted to support the loads on the flooring panels 16. Most preferably, each of the Y-shaped supports 22 includes a lower support post region 24 and an upper fork region 26. As shown in FIG. 5, the lower support post region 24 is fabricated so as to include opposed sides 24-1 that diverge outwardly and downwardly relative to a central longitudinal vertical plane (relative to the aircraft fuselage AF). In especially preferred embodiments, the typical angular divergence of the opposed sides 24-1 is between about 2° to about 5°, preferably about 3°. The individual support post regions 24 have a length that is sufficient so as to be joined to the frame and/or stringer members (not shown) associated with the aircraft fuselage AF structure.

The upper fork region 26 includes a generally U-shaped edge 26-1 which defines an upper interior space to accommodate the dependent laterally separated and longitudinally extending web flanges 34a and 34b of the beams 30 to be discussed further below. The upper fork region 26 also has opposed edges 26-2 which outwardly and upwardly diverge symmetrically relative to one another. In preferred embodiments, the angle Φ formed between the divergent edges 26-2 is between about 50° to about 75°, more preferably about 60°. As is shown in FIG. 5, the edges 26-2 are most preferably joined to a respective one of the sides 24-1 by an arcuate or rounded transition surface.

Each end of the fork regions 26 is connected to a respective one of the bridge sections 23. The bridge sections 23 and the Y-shaped supports 22 thus provide a unitary structure that is adapted to be interconnected to and support the longitudinal beams 30.

Furthermore, it will be observed in FIG. 5 that the doubler flange 23-1 in the vicinity of the upper fork region 26 includes a pair of surface recesses 28 laterally adjacent the upper extent of the U-shaped edge 26-1. These recesses 28 are provided so as to accommodate the thickness dimension of the bridge fixation fingers 36 associated with the beam 30 when the beam 301 is fixed to the bridges 20. In such a manner, the flooring panels 16 may be positioned onto the joined transverse bridges 20 and beams 30 without any planar discontinuities.

Figure 6:
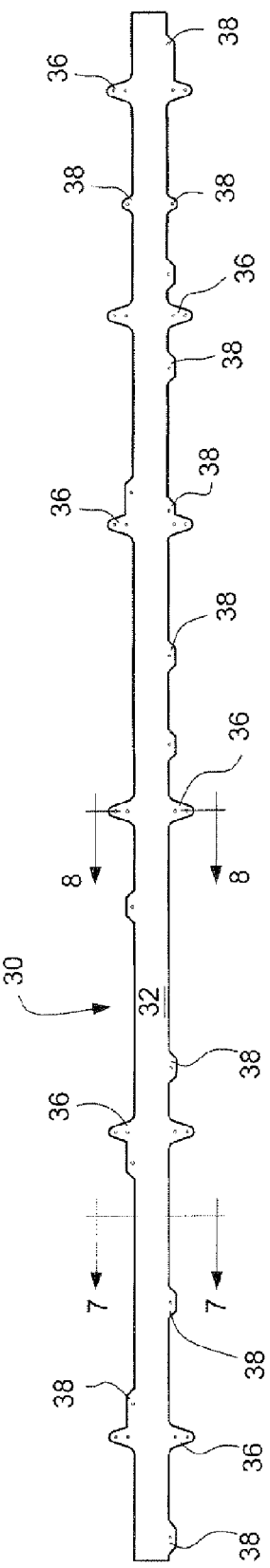
FIG. 6 is a top plan view of an exemplary longitudinal beam employed in the aircraft cabin flooring system of the herein disclosed embodiment.
Figure 7:
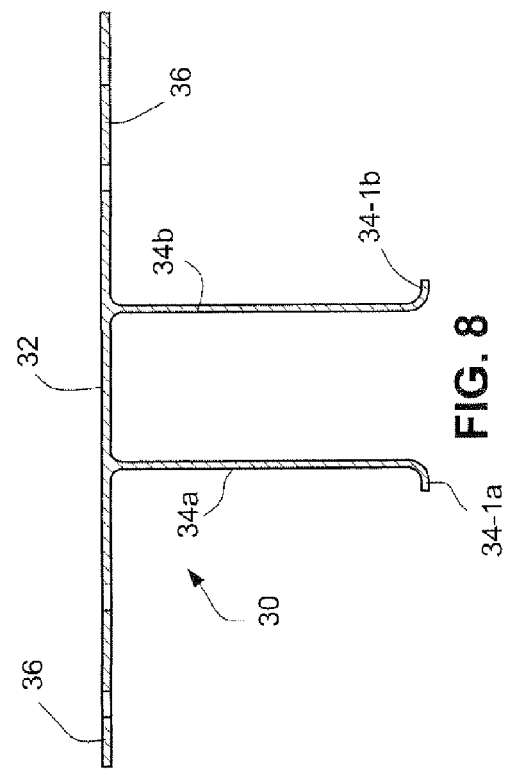
FIG. 7 is an enlarged cross-sectional view of the longitudinal beam as taken along line 7-7 in FIG. 6.
Figure 8:
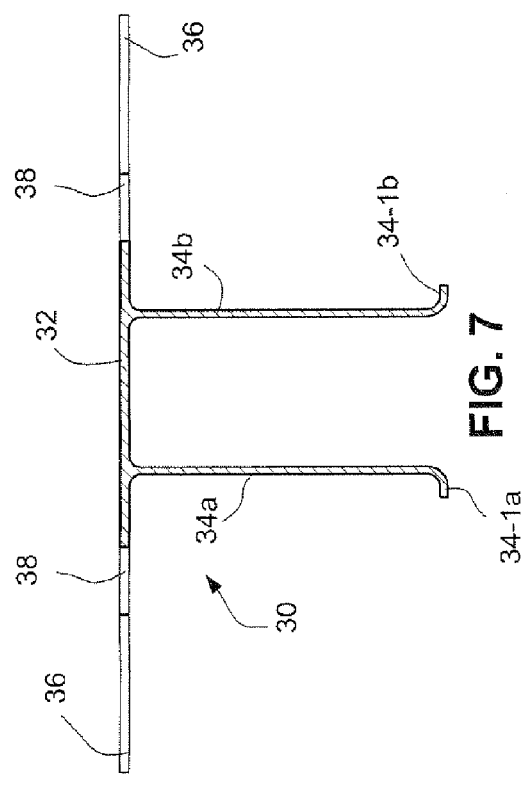
FIG. 8 is an enlarged cross-sectional view of the longitudinal beam as taken along line 8-8 in FIG. 6.

Accompanying FIGS. 6-8 show in somewhat greater detail a representative longitudinal beam 30 employed in the aircraft cabin flooring system 10. As depicted, the beam 30 includes an upper flange 32 which serves as a doubler to support the loads of the floor panels 16 installed thereon, and a pair of opposed separated web flanges 34a, 34b depending therefrom. The seat track 14 is rigidly fixed to the upper flange 32 coincident with its central longitudinal axis.

The terminal ends of the web flanges 34a, 34b are provided with stiffener flanges 34-1a, 34-1b, respectively, extending oppositely laterally relative to one another. Opposed pairs of bridge fixation fingers (a representative few of which are noted by reference numeral 36) protrude laterally outwardly from the upper flange 32 of the beam 30 at predetermined longitudinally spaced apart locations depending on the layout design of the transverse bridges 20 so as to allow attachment of the beam 30 to a respective one of the bridges 20. In addition, a series of flooring fixation fingers (a representative few of which are identified by reference numeral 38) are provided which protrude outwardly laterally from the upper flange 32 of the beam 30 so as to allow fixation of respective flooring panels 16 to the beam 30. The fixation fingers 36 and 38 may be pre-drilled to accommodate securing elements, e.g., rivets, bolts, and the like.

As briefly noted above, the beams 30 are assembled with the transverse bridges 20 in such a manner that the web flanges 34a, 34b thereof extend downwardly into the U-shaped space of the Y-shaped supports defined by the edge 26-1 of the upper fork region 26. The fixation fingers 36 are connected to the doubler flange 23-1 of a respective underlying transverse bridge 20 by means of suitable rivets, bolt assemblies and like joining means. In addition, angle brackets 39 are preferably provided so as to join by similar means the web flanges 34a, 34b to an adjacent mutually perpendicular structural section of the Y-shaped supports 22. In a similar fashion, the lateral ends of the doubler flanges 23-1 associated with the transverse bridges 20 may be connected to the lower tabs 42 of the side sills 40 while the upper tabs 44 thereof are connected to the frame and/or stingers (not shown) of the aircraft fuselage AF. In such a manner, the flooring system 10 is integrated into a rigid structural unit that will accommodate the loads placed thereon.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A load-supporting aircraft flooring system comprising:
   a longitudinally separated series of transverse bridges, wherein each of the transverse bridges includes an upper doubler flange which defines latitudinally separated upper openings; and
   a latitudinally separated series of beams, wherein each of the beams includes an upper flange and a pair of separated depending web flanges received within respective upper openings of the transverse bridges, wherein
   the upper flanges and web flanges of the beams are connected to the transverse bridges.

2. The flooring system of claim 1, wherein the transverse bridges include latitudinally separated Y-shaped supports which define the upper openings thereof.

3. The flooring system of claim 2, wherein the Y-shaped supports include an upper fork region and a lower support post region.

4. The flooring system of claim 3, wherein the lower support post region defines outwardly and downwardly divergent side edges.

5. The flooring system of claim 3, wherein the upper fork region defines outwardly and upwardly divergent side edges.

6. The flooring system of claim 1, wherein the beams include opposed bridge fixation fingers for joining the beams to a respective underlying one of the transverse bridges.

7. The flooring system of claim 1, further comprising aircraft flooring panels connected to the beams.

8. The flooring system of claim 7, wherein the beams include flooring fixation fingers for joining the beams to the aircraft flooring panels.

9. The flooring system of claim 1, wherein the web flanges have outwardly directed stiffener flanges at terminal ends thereof.

10. The flooring system of claim 1, further including angle brackets joining the web flanges to the transverse bridges.

11. The flooring system of claim 1, further comprising a pair of longitudinally oriented angled side sills having lower attachment fingers attached to respective ends of the transverse bridges and upper attachment fingers adapted for connection to structural components of an aircraft fuselage.

12. The flooring system of claim 11, wherein each of the transverse bridges, the longitudinal beams and the side sills is formed of a fiber-reinforced composite material.

13. The flooring system of claim 1, wherein each of the transverse bridges and the longitudinal beams is formed of a fiber-reinforced composite material.

14. The flooring system of claim 1, wherein the beams include seat tracks.

15. An aircraft which includes a flooring system as in claim 1.

16. A transverse bridge component comprising an elongate unitary structure which includes a plurality of spaced-apart Y-shaped supports, each of the Y-shaped supports being interconnected to one another by a bridge section so that the transverse bridge component extends over a predetermined length dimension thereof, wherein each of the Y-shaped supports defines an upper space so as to provide respective corresponding openings of the transverse bridge component that are separated from one another along the predetermined length dimension of the transverse bridge component.

17. The component of claim 16, wherein each of the Y-shaped supports include an upper fork region and a lower support post region.

18. The component of claim 17, wherein the lower support post region defines outwardly and downwardly divergent side edges.

19. The component of claim 17, wherein the upper fork region defines outwardly and upwardly divergent side edges.

20. The component of claim 16, wherein the elongate unitary structure is formed of a fiber-reinforced composite material.

21. A beam structure for a flooring system comprising an elongate unitary structure which includes an upper flange and a pair of spaced-apart web flanges depending from the upper flange, wherein the upper flange has a widthwise dimension and includes opposed pairs of bridge fixation fingers spaced apart from one another along a lengthwise dimension of the beam structure, wherein each of the pairs of fixation fingers is adapted to join the beam structure to a respective supporting bridge structure.

22. The beam of claim 21, wherein the web flanges have outwardly directed stiffener flanges at terminal ends thereof.

23. The beam of claim 21, further comprising a seat track attached to the upper flange.

24. A method of forming an aircraft flooring system comprising:
   (a) providing a series of transverse bridges and beams, the transverse bridges having spaced-apart upper openings in an upper doubler flange thereof, and the beams having a pair of spaced-apart web flanges depending from an upper flange thereof;
   (b) positioning the bridges transversely relative to an aircraft fuselage;
   (c) positioning the beams longitudinally relative to the aircraft fuselage such that the web flanges are received in respective ones of the upper openings of the bridges; and
   (d) joining the bridges and beams to one another.

25. The method of claim 24, further comprising joining flooring panels to the beams.

26. The method of claim 24, further comprising joining the bridges to structural components of the aircraft fuselage.

27. The method of claim 26, wherein joining the bridges to the aircraft fuselage comprises providing angled side sills and interconnecting the side sills to structural components of the aircraft fuselage and to the bridges.

28. The method of claim 24, wherein (d) includes providing angle brackets and fixing the angle brackets to interconnect the web flanges to a respective adjacent bridge.

* * * * *